United States Patent
Okutsu et al.

(10) Patent No.: US 8,313,040 B2
(45) Date of Patent: Nov. 20, 2012

(54) TEMPERATURE SENSING TUBE FOR EXPANSION VALVE

(75) Inventors: Kinya Okutsu, Tokyo (JP); Akinori Nanbu, Tokyo (JP); Mafumi Morita, Tokyo (JP)

(73) Assignee: Fujikoki Corporation, Setagaya-Ku, Tokyo (JP)

( * ) Notice: Subject to any disclaimer, the term of this patent is extended or adjusted under 35 U.S.C. 154(b) by 365 days.

(21) Appl. No.: 12/382,778

(22) Filed: Mar. 24, 2009

(65) Prior Publication Data

US 2009/0241571 A1 Oct. 1, 2009

(30) Foreign Application Priority Data

Mar. 28, 2008 (JP) .................................. 2008-087219

(51) Int. Cl.
*G05D 23/12* (2006.01)

(52) U.S. Cl. ......... 236/99 R; 236/92 B; 62/222; 62/225; 374/187; 374/201; 374/202; 374/203; 374/205; 374/206; 374/207

(58) Field of Classification Search .................... 62/222, 62/225; 236/92 B, 99 R; 374/187, 201–203, 374/205–207
See application file for complete search history.

(56) References Cited

U.S. PATENT DOCUMENTS

| 3,144,206 A | * | 8/1964 | Seiffert | 236/99 R |
| 5,044,170 A | * | 9/1991 | Tanaka | 62/225 |
| 5,044,551 A | * | 9/1991 | Tanaka et al. | 236/92 B |

FOREIGN PATENT DOCUMENTS

JP 02116726 A * 5/1990

* cited by examiner

*Primary Examiner* — Frantz Jules
*Assistant Examiner* — Azim Abdur Rahim
(74) *Attorney, Agent, or Firm* — Bacon & Thomas, PLLC

(57) ABSTRACT

To provide a temperature sensing tube for an expansion valve in which a hunting can be prevented by slowing of a temperature reaction rate of an expansion valve, a ceramic sintered member serving as a heat transfer delay member (3) in a temperature sensing tube (1) is fixed so as not to directly contact with a tubular member (2) by fixing springs (4, 4) provided at both end portions (13, 13), whereby a heat transfer from the tubular member (2) to the ceramic sintered member becomes slow, temperature is not transferred from a mated piping directly via the tubular member, whichever outer surface of the temperature sensing tube 1 contacts with the piping, and a reaction rate with respect to a temperature rise of the expansion valve can be made slow.

3 Claims, 3 Drawing Sheets

TEMPERATURE SENSING TUBE FOR EXPANSION VALVE

BACKGROUND OF THE INVENTION

1. Field of the Invention

This invention relates to a temperature sensing tube for an expansion valve, which senses a refrigerant temperature in an outlet of an evaporator, for example, by being attached to a piping of the evaporator, and is used for controlling a flow rate of the expansion valve on the basis of the sensed temperature, in order to control a flow rate of a refrigerant passing the expansion valve.

2. Description of the Conventional Art

In conventional, a refrigeration system is generally constructed by connecting a condenser, an evaporator and a compressor by a refrigerant piping, and a temperature expansion valve is arranged between the condenser and the evaporator. The temperature expansion valve has both a function of depressurizing a refrigerant supplied to the evaporator so as to make refrigerant evaporation within the evaporator easy and a function of controlling a flow rate of the refrigerant flowing into the evaporator. In the temperature expansion valve, a valve opening degree is controlled in accordance with feedback control by a superheat degree signal on the basis of a difference between a superheat evaporation temperature in an outlet of the evaporator and an evaporation temperature. A mechanism for converting the signal into the valve opening degree is a power element portion, evaporation pressure and force of a bias spring are applied to a lower portion of a diaphragm constructing the power element portion, and pressure of an internal gas of the temperature sensing tube which is thermally balanced with the evaporation temperature in the outlet of the evaporator is applied to an upper portion of the diaphragm.

FIG. 4 is an explanatory view showing an outline of the temperature sensing tube for controlling the temperature expansion valve in the refrigeration cycle. As shown in FIG. 4, a so-called temperature sensing tube 31 is attached so as to come into contact with a piping of the evaporator, for sensing the superheat evaporation temperature in the outlet of the evaporator. The temperature sensing tube 31 is connected to a power element portion of a temperature expansion valve 30 through a capillary tube 32. The power element portion has a well-known structure provided with a diaphragm, and gas pressure from the temperature sensing tube 31 is supplied to an upper pressure chamber of the power element portion through the capillary tube 32. Further, since a lower pressure chamber of the diaphragm communicates with a valve chamber of the temperature expansion valve 30, the diaphragm is activated by a pressure change within the pressure chamber on the basis of a temperature change of the refrigerant within the temperature sensing tube 31, and the valve opening degree of the temperature expansion valve 30 is changed, thereby controlling the flow rate.

In the refrigeration system, there is a hunting as a phenomenon which is preferably avoided. The hunting is a phenomenon that excess and short of the refrigerant supply amount to the evaporator are repeated, due to a structure of the evaporator, piping of the refrigerant circuit, a mode of use of the temperature expansion valve, a balance with a thermal load, and the like. If this phenomenon is caused, there occurs an adverse effect that a capacity of the whole of the refrigeration cycle is lowered, and a load such as returning back of liquid to the compressor or the like is increased.

As one of suppressing methods of the hunting phenomenon, there can be indicated a method of charging and sealing a thermal ballast serving as a heat transfer delaying member in an inner portion of the temperature sensing tube constructing the power element of the temperature expansion valve so as to delay a valve opening speed at a time when the superheat degree rises. As the thermal ballast, there is employed a heat insulating material having a fixed heat capacity and having a bad heat transfer, for example, a ceramic sintered material constituted by an alumina silica. Further, Japanese Unexamined Patent Publication No. 1-179871 discloses a temperature expansion valve structured such that a temperature sensing tube, in which a ceramic sintered member constituted by a silica alumina is arranged in an inner portion, is connected to a power element portion by a capillary tube.

SUMMARY OF THE INVENTION

Problem to be Solved by the Invention

The conventional temperature sensing tube in which the ceramic sintered member is arranged in the inner portion is attached, for example, in a state of being attached to the piping of the evaporator. However, if the ceramic sintered member is accommodated in a state of coming into contact with a container of the temperature sensing tube, heat tends to be transferred to the ceramic sintered member from the piping via the temperature sensing tube container, depending on attaching attitude of the temperature sensing tube to the piping, so that a reaction rate to temperature becomes too high and there is a risk that the hunting is caused.

An object of this invention is to provide a temperature sensing tube for an expansion valve, in which hunting can be prevented by slowing a temperature reaction rate of an expansion valve, while paying attention to the actual condition mentioned above.

Means for Solving the Problem

In order to solve the problem mentioned above, this invention is a temperature sensing tube for an expansion valve, in which a heat transfer delay member is fixed so as to be spaced from an inner surface of a tubular member over its whole periphery.

Effect of the Invention

In the temperature sensing tube for the expansion valve in accordance with this invention, since the heat transfer delay member is fixed in such a manner as not to directly come into contact with the tubular member, heat transfer from the tubular member to the heat transfer delay member becomes slow, in comparison with the case that the heat transfer delay member is fixed in direct contact with the tubular member. Accordingly, it is possible to suppress the hunting from being caused.

Further, a stable time constant can be obtained in flow rate control of the expansion valve. Further, since the heat transfer delay member does not come into contact with the inner surface of the tubular member over its whole periphery, it is not necessary to attach the temperature sensing tube to a mated piping after having specified an attaching surface of the temperature sensing tube, at a time of attaching the temperature sensing tube to the mated piping, it is not necessary to carry out a work while paying attention to a particular structure for specifying the attaching surface, and a particular attaching surface in the attaching work, and it is possible to simplify the attaching work.

DETAILED DESCRIPTION OF PREFERRED EMBODIMENT

Figure 1:
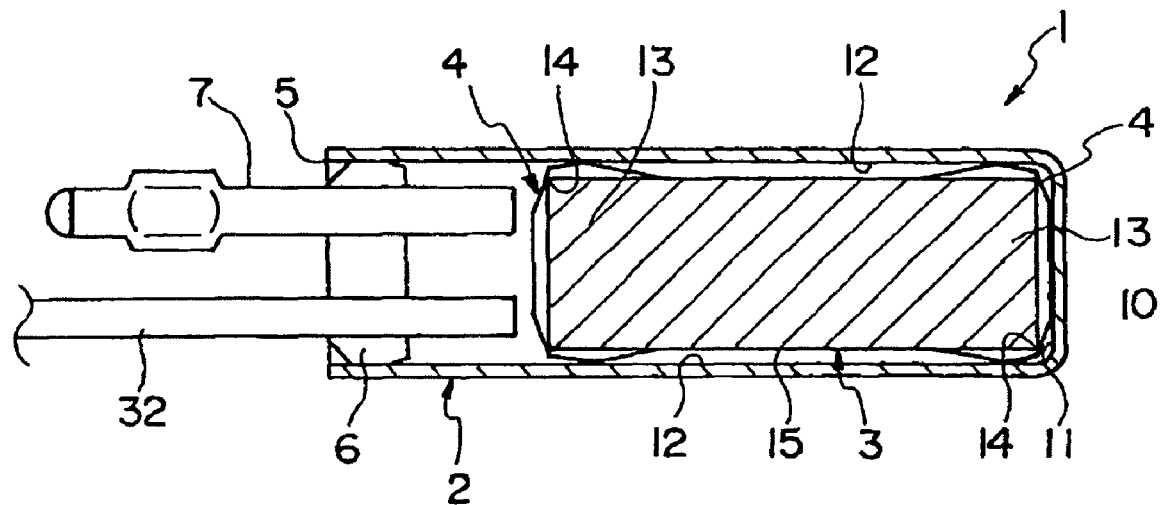
FIG. 1 is a longitudinal sectional view of an embodiment of a temperature sensing tube for an expansion valve in accordance with this invention.
Figure 2:
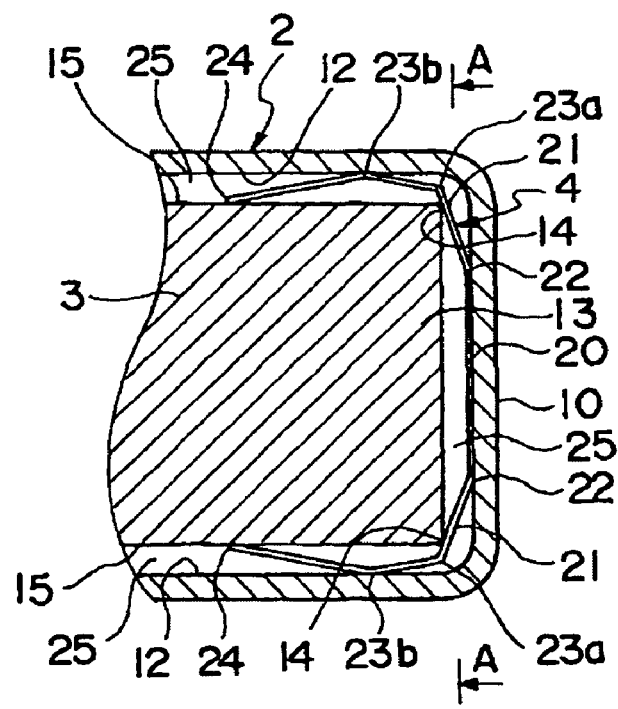
FIG. 2 is a longitudinal sectional view showing a substantial part of the temperature sensing tube for the expansion valve shown in FIG. 1 in an enlarged manner.
Figure 3:
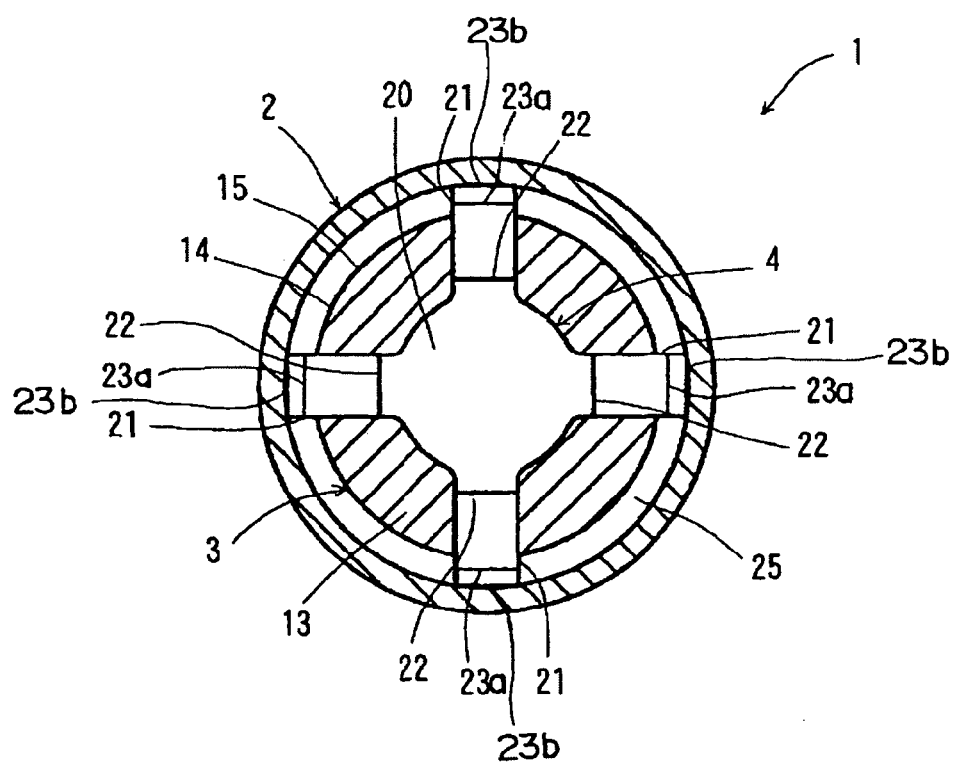
FIG. 3 shows a cross section along a line A-A in FIG. 2 and is a cross sectional view showing a substantial part of the temperature sensing tube for the expansion valve shown in FIG. 1 in an enlarged manner.
Figure 4:
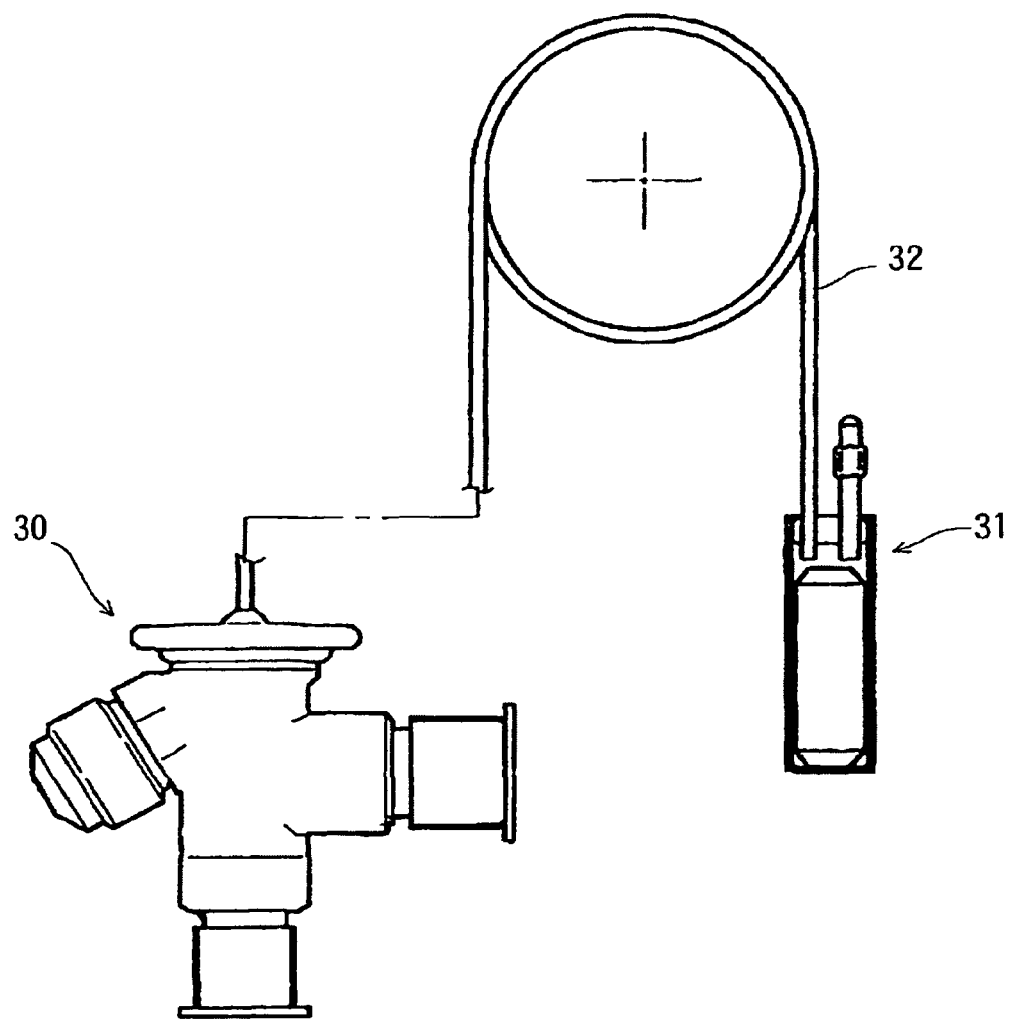
FIG. 4 is an explanatory view showing an outline of a temperature sensing tube for controlling a temperature expansion valve in a conventional refrigeration cycle.

A description will be given below of an embodiment of a temperature sensing tube for an expansion valve in accordance with this invention, on the basis of the accompanying drawings. FIG. 1 is a longitudinal sectional view of an embodiment of a temperature sensing tube for an expansion valve in accordance with this invention, FIG. 2 is a longitudinal sectional view showing a substantial part of the temperature sensing tube for the expansion valve shown in FIG. 1 in an enlarged manner, and FIG. 3 shows a cross section along a line A-A in FIG. 2 and is a cross sectional view showing a substantial part of the temperature sensing tube for the expansion valve shown in FIG. 1 in an enlarged manner.

As shown in FIG. 1, a temperature sensing tube 1 in accordance with the present invention is provided with a tubular member 2 having a bottom at one end portion, a ceramic sintered member 3 serving as a heat transfer delay member (a time constant member) accommodated in an inner portion of the tubular member 2 and made of an alumina silica, and fixing springs 4 and 4 for fixing the ceramic sintered member 3 to the tubular member 2.

The other end portion of the tubular member 2 is formed as an opening portion 5, and a seal member 6 is fixed to the opening portion 5 in an airtight state by brazing. A capillary tube 32 passing through the seal member 6 is fixed also by brazing to the seal member 6, and an inner portion of the temperature sensing tube 1 is connected to a power element portion of the expansion valve through the capillary tube 32 similarly to the conventional structure. Further, a pipe 7 for filling a refrigerant is connected to the seal member 6. A gas which changes its pressure on the basis of a temperature is sealed within the temperature sensing tube 1, and an internal pressure changes on the basis of the temperature change of the temperature sensing tube 1 so as to control a valve opening degree of the expansion valve.

The ceramic sintered member 3 is sandwiched from both sides by the fixing springs 4 and 4, and is inserted into the temperature sensing tube 1. In particular, each of the fixing springs 4 is made by a tabular spring, and has a base portion 20 forming a center spring main body, and four leg portions 21 extending from a periphery of the base portion 20. Each of the leg portions 21 has bent portions 22, 23a and 23b which extend from the main body portion 20 and are bent at a root portion and intermediate portions.

Prior to an insertion of the ceramic sintered member 3 to the inner portion of the temperature sensing tube 1, the fixing springs 4 are attached to both ends 13 and 13 of the ceramic sintered member 3 in such a manner as to cover the end portions. At this time, each of the leg portions 21 of the fixing spring 4 extends to an outer peripheral surface 15 of the ceramic sintered member 3 beyond an end portion peripheral edge portion 14 of the ceramic sintered member 3. In other words, it comes into contact with the peripheral edge portion 14 of the end portion 13 of the ceramic sintered member 3 at a position between the bent portions 22 and 23a. Further, a front end portion 24 of each of the leg portions 21 comes into contact with the outer peripheral surface 15 of the ceramic sintered member 3.

In a state that the fixing springs 4 are installed to the ceramic sintered member 3, the ceramic sintered member 3 is inserted to the tubular member 2. In the state of the ceramic sintered member 3 being inserted, the fixing spring 4 at an insertion leading end side comes to a state of being stopped at and in contact with an inner bottom surface 11 of a bottom portion of the tubular member 2, and a position of the ceramic sintered member 3 is defined within the tubular member 2 in this state.

In a state that the ceramic sintered member 3 is inserted and fixed, each of the leg portions 21 of each of the fixing springs 4 comes to a state that the bent portion 23b is pressed by spring force from an inner peripheral surface 12 of the tubular member 2, and is resiliently engaged with the inner peripheral surface 12. The ceramic sintered member 3 is held and fixed by the spring force at an intermediate portion with which the end portion peripheral edge portion 14 comes into contact and a front end portion 24, in each of the leg portions 21, and is prevented from moving loosely within the tubular member 2. Further, since the ceramic sintered member 3 comes to a state that the ceramic sintered member 3 is elastically supported by the fixing springs 4, a shock and a vibration are hardly transmitted to the ceramic sintered member 3, breakage of the ceramic sintered member 3 is hardly caused during a time when the temperature sensing tube 1 is sent to a site of installation field to a refrigeration cycle from a site of manufacture, and breakage of the ceramic sintered member 3 is hardly caused even if it is installed in an equipment which is used under such an environment that a shock and a vibration tend to be generated, such as a refrigeration vehicle. The front end portion 24 of each of the leg portions 21 of the fixing springs 4 is positioned at an inner side in a radial direction from the bent portion 23b, and the ceramic sintered member 3 is fixed to the tubular member 2 in a state that a gap 25 is formed between the ceramic sintered member 3 and the inner surface 12 of the tubular member 2.

In the temperature sensing tube 1 constructed as mentioned above, the ceramic sintered member 3 and the tubular member 2 do not directly come into contact because of an existence of the gap 25. Accordingly, when the temperature sensing tube 1 is attached to a piping of an evaporator, conduction of heat, which is transferred from the piping to the tubular member 2, to the ceramic sintered member 3 is delayed by the gap 25.

As mentioned above, since a temperature rise of the ceramic sintered member 3 is slow in comparison with a temperature rise of the tubular member 2 of the temperature sensing tube 1, a temperature reaction rate of the gas sealed within the temperature sensing tube 1 becomes slow. Accordingly, since the temperature within the temperature sensing tube 1 is slowly changed, it is possible to make a reaction rate with respect to the temperature rise of the expansion valve slow, and it is possible to prevent a hunting.

Further, since the gap 25 exists between the ceramic sintered member 3 and the tubular member 2 in all the directions around the ceramic sintered member 3, the gap 25 is interposed between the ceramic sintered member 3 and the piping whatever direction the temperature sensing tube 1 is attached to the piping of the evaporator. Accordingly, it is possible to attach the temperature sensing tube 1 to the piping of the evaporator without paying attention to the direction of the temperature sensing tube 1, and it is possible to improve an attaching workability.

In the embodiment of the temperature sensing tube in accordance with the present invention, the description is given of the illustrated shape and structure of the fixing springs 4, however, the structure is not limited to the illustrated shape as far as the fixing spring can stably hold the member so as to have the gap 25 formed in all the directions around the ceramic sintered member 3 between it and the tubular member 2. For example, it is preferable that the fixing spring 4 is provided with at least three leg portions 21 for a stability of fixing. Further, it is not necessary to form the angular bent portions 22, 23a and 23b, but it is possible to employ curved portions which are engaged by elastic force with the inner peripheral surface 12 of the tubular member 2 and the outer peripheral surface 15 of the ceramic sintered member 3.

What is claimed is:

1. A temperature sensing tube for an expansion valve comprising:
    a tubular member having an inner surface;
    a heat transfer delay member having opposite end portions having peripheral edge portions and an outer periphery extending between the opposite end portions thereof, and accommodated in the tubular member, gas pressure being output in correspondence to a temperature of said heat transfer delay member; and
    fixing springs provided between the tubular member and the heat transfer delay member, wherein the fixing springs are configured to support the heat transfer delay member resiliently at the peripheral edge portions of the opposite end portions and between the outer periphery of the heat transfer delay member with respect to the tubular member,
    wherein said fixing springs each comprises a tabular base portion and a plurality of leg portions extending from a periphery of said base portion, each of said plurality of leg portions having at least first and second bent portions, wherein said tabular base portion supports one of said opposite end portions of the heat transfer delay member, and said leg portions contacts the peripheral edge portions of the opposite end portions between the first and second bent portions and are resiliently engaged with the inner surface of said tubular member and the outer periphery of the heat transfer delay member, and
    wherein said heat transfer delay member is fixed so as to be spaced from the inner surface of said tubular member over the whole outer periphery of the heat transfer delay member.

2. The temperature sensing tube of claim 1, wherein each of the plurality of leg portions further comprises a third bent portion connected to the first and second bent portions and a front end portion extending from the third bent portion, wherein said front end portion is arranged to contact said outer periphery of the heat transfer delay member and said third bent portion is arranged to contact the inner surface of the tubular member to create a spring force for holding and fixing the heat transfer delay member.

3. The temperature sensing tube of claim 1, wherein said leg portions contact the heat transfer delay member only at positions between the first and second bent portions and the front end portion to form a gap between the heat transfer delay member and the tubular member.

\* \* \* \* \*